US009397933B2

(12) United States Patent
Carney et al.

(10) Patent No.: US 9,397,933 B2
(45) Date of Patent: Jul. 19, 2016

(54) METHOD AND SYSTEM OF PROVIDING MICRO-FACILITIES FOR NETWORK RECOVERY

(75) Inventors: Mark D. Carney, Sterling, VA (US); Harold Jason Schiller, Silver Spring, MD (US); Dante J. Pacella, Charles Town, WV (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 741 days.

(21) Appl. No.: 12/974,347

(22) Filed: Dec. 21, 2010

(65) Prior Publication Data

US 2012/0155250 A1 Jun. 21, 2012

(51) Int. Cl.
*H04L 12/713* (2013.01)
*H04L 12/24* (2006.01)
*H04L 12/703* (2013.01)

(52) U.S. Cl.
CPC .......... *H04L 45/586* (2013.01); *H04L 41/0668* (2013.01); *H04L 41/0896* (2013.01); *H04L 41/5025* (2013.01); *H04L 45/28* (2013.01)

(58) Field of Classification Search
USPC .................................. 370/216–218, 221, 225
See application file for complete search history.

(56) References Cited

U.S. PATENT DOCUMENTS

| 8,014,275 | B1 * | 9/2011 | Sundt et al. ................... 370/217 |
| 2004/0052207 | A1 * | 3/2004 | Charny et al. ................. 370/216 |
| 2006/0239271 | A1 * | 10/2006 | Khasnabish et al. ..... 370/395.21 |
| 2009/0231092 | A1 * | 9/2009 | Maegawa ............... G05B 15/02 340/5.2 |
| 2011/0317820 | A1 * | 12/2011 | Torgersrud et al. ........ 379/88.09 |

* cited by examiner

*Primary Examiner* — Hassan Phillips
*Assistant Examiner* — Omeed D Rahgozar

(57) ABSTRACT

An approach provides micro-facilities for network recovery. An outage condition is detected, and is associated with one of a plurality of service provider facilities forming a service provider network. A router of the service provider network is determined to be capable of reaching the one service provider facility, wherein the provider router is resident within a customer facility. Bandwidth is allocated to one or more links for re-directing traffic over the provider router to the one service provider facility.

15 Claims, 9 Drawing Sheets

METHOD AND SYSTEM OF PROVIDING MICRO-FACILITIES FOR NETWORK RECOVERY

BACKGROUND INFORMATION

Modern communication networks are growing in size and complexity. Given the highly competitive nature of the telecommunications industry, network service providers are increasingly relying on network performance as a key differentiator for delivering communication services. In many instances, the impact of network outages (failures) or even lapses in network performance can result in substantial monetary losses. When network outages occur, for example, due to power issues, natural disasters, catastrophic equipment failures, fiber cuts, etc., an entire city, region or even country may lose various telecommunication services, e.g., telephone service, Internet access, etc. This can impact emergency services (such as e911). Moreover, the outage can have a very negative impact on Service Level Agreements (SLAs) between service providers and their customers, thereby costing providers significant amounts of otherwise billable revenue. Furthermore, when a major outage occurs, restoration is problematic, in part, because the identification of all the individual circuits that need to be repaired is painstaking and slow until the primary ones are restored allowing visibility to the affected region.

Therefore, there is a need for an approach to more effectively provide network detection and recovery.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for providing network recovery using a provider router implemented at a customer facility is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a router, it is contemplated that these embodiments have applicability to other network elements and devices capable of processing network traffic.

Figure 1:
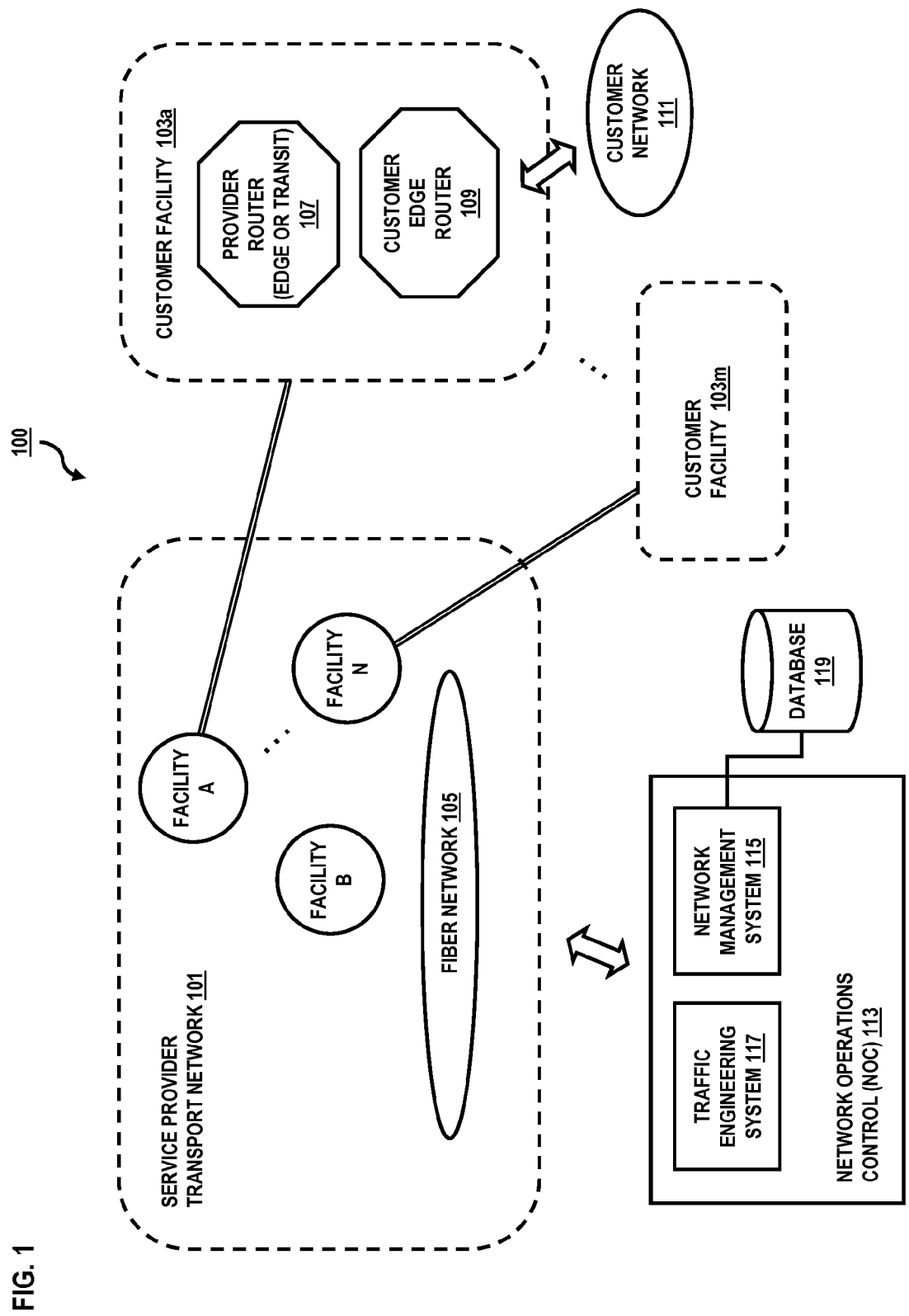
FIG. 1 is diagram of a communication system utilizing a provider router to assist with network recovery, according to various embodiments.

FIG. 1 is diagram of a communication system utilizing a provider router to assist with network recovery, according to various embodiments. For the purposes of illustration, system 100 includes a transport network 101 that includes multiple facilities (A-N) to provide connectivity to one or more user (e.g., customer) facilities 103a-103m, and that permits effective network recovery from outages. In certain embodiments, the transport network 101 provides telecommunication services over a fiber network 105 (e.g., Synchronous Optical Network (SONET), Dense Wavelength Division Multiplexing (DWDM), etc.), and is operated and managed by a service provider (e.g., telecommunications provider). The term "facility," according to certain embodiments, refers to networking resources, such as circuits, hardware, software, or any combination thereof, to provide network connectivity and associated traffic transport functionalities. It is recognized that many customers (or subscribers) provision less than full capacity of the circuits used to deliver the service. For the purposes of explanation, one such service, e.g., burstable services are described herein. This service can be provided with an expected level of typical use (or baseline bandwidth) and the capability to use more capacity on demand (burstable bandwidth). Moreover, a number of large customers also purchase multiple circuits with physical and logical diversity. As such, these customers are effectively connected to multiple facilities, creating an opportunity to bridge the two across the customer connections (provided the customer circuits do not traverse the same circuit or link involved in an outage).

Figure 7:
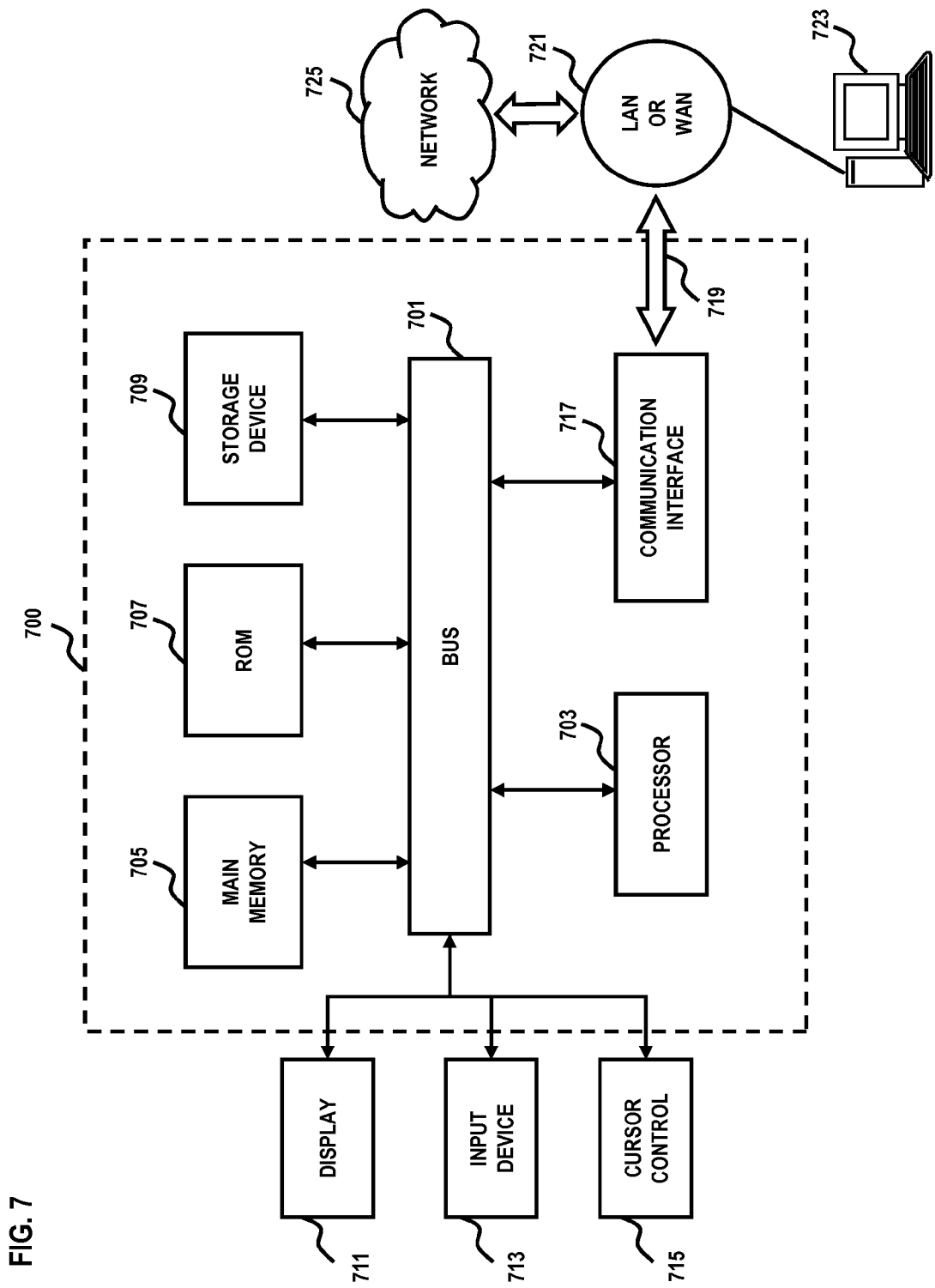
FIG. 7 is a diagram of a computer system that can be used to implement various exemplary embodiments.
Figure 8:
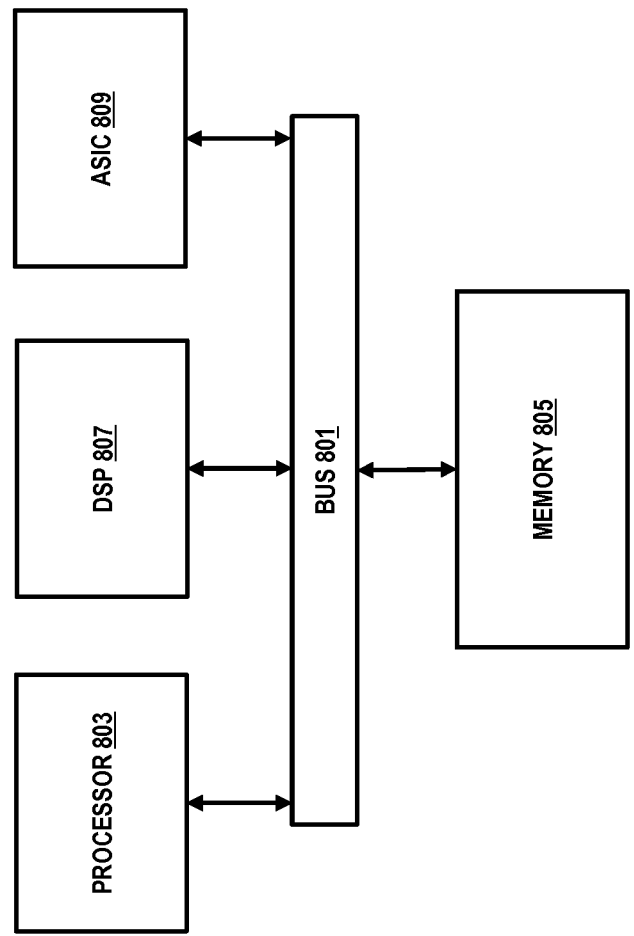
FIG. 8 is a diagram of a chip set that can be used to implement an embodiment of the invention.

As shown, customer facility 103a, according to one embodiment, includes a provider router 107 that is managed by the service provider of network 101, and depending on the circumstances can behave as an edge router (i.e., "provider edge router") or a transit router (i.e., "provider transit router"). Network devices, such as routers, play a key role in the rapid and successful transport of information to and from a variety of networks. The provider router 107, for example, operates at the physical layer, link layer and network layer of the Open Systems Interconnection (OSI) model to transport data across the network 101. In general, the provider router 107 can determine the "best" paths or routes by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), Open Shortest Path First (OSPF), and Intermediate System to Intermediate System (IS-IS). In addition to intelligently forwarding data, the router 107 can provide various other functions, such as firewalling, encryption, etc. It is noted that the label distribution can also involve piggybacking on the BGP or OSPF routing protocols. The router functions can be performed using a general purpose computer (e.g., as shown in FIG. 7), or be highly specialized hardware platform (e.g., as shown in FIG. 8) with greater processing capability to process high volumes of data and hardware redundancies to ensure high reliability.

The provider router 107 can be referred to as a "micro-facility" from the perspective of the service provider. This micro-hub or micro-facility router (MFR) 107 interfaces with a customer edge router 109, which serves customer network 111. In one embodiment, one or more MFRs 107 (of which one is shown) are placed at the customer location, whereby the customer would agree to provide power/cooling; optionally, the service provider can supply various incentives (e.g., reimbursement for operational expenses) for such an agreement. These provider routers 107 may be connected to or meshed with the customer's edge router(s) at the facility 107. Each MFR 107 can operate as a provider edge device and can be configured as a provider transit device in the event of an outage affecting one of the connected backbone facilities. In one embodiment, the MFR 107 and customer router 107 (which may be managed customer premise equipment (CPE)) may be virtual instances within the same physical routing device, as described below with respect to FIG. 4.

With the provider router 107 deployed at the customer facility 103a (or customer premise), the network operations control (NOC) 113 can detect, via a network management system 115, any outage condition within service provider transport network 101 as well as customer facilities 103a-103m, and implement recovery procedures for proper network restoration. An "outage condition" can refer to any equipment or circuit failure associated with one or more facilities that hinder or prevent the delivery of traffic. Additionally, by way of example, NOC 113 includes a traffic engineering system 117 to adjust bandwidth allocations associated with circuits or links within and between the network 101 and customer facilities 103a-103n in response to the outage condition. Accordingly, even if the transport network 101 itself cannot recover from the outage condition (assuming the failed facility is isolated—i.e., not reachable within network 101), this approach enables effective recovery. Reducing the restoration time improves customer uptime and protects carrier revenue. In addition to outage recovery, this approach can be employed to provide other capabilities. For example, emergency calls (e.g. 911 services) may be redirected across micro-facility connections to ensure availability even when primary communications channels are unavailable.

By way of example, network management system 115 can monitor the transport network 101, collecting usage data, and analyzing the usage data to detect problems associated with, for example, Service Level Agreement (SLA) requirements, Quality of Service (QoS) guarantees, etc. Network links used to carry information traffic throughout a network by nature have limited capacity to carry traffic. Network operators must attempt to ensure both quality of service QoS guarantees for services provided, and SLA requirements to customers. When an SLA requirement and/or a QoS guarantee are not met, then corrective action may be necessary. The growth or contraction of customer usage of a network over time can have serious effects on the ability of a network to satisfy SLA requirements and/or QoS guarantees. For example, the growth of the number of employees in a company, and thus the number of employees utilizing a computing network of the company, can increase over time to a point where the network link(s) is being over-utilized and data transmission slows. As the data communication amongst units of a business is important to the operation of the business, fast and efficient flow of data throughout the business is essential. Thus, such a situation can have serious consequences to the business.

The network management system 115 can interface with or incorporate a data repository 119 that is used to store usage (traffic) data collected by the network management system 115 from the transport network 101. There can be many input parameters to be considered when determining whether a problem exists, such as the customers and their needs, different types of services being provided and the QoS needs of the services being provided, specific bandwidth requirements for the services and the customers, etc. For example, when a particular requirement is not met or usage crosses a set threshold, it signifies a failure and corrective action(s) are performed. Depending upon the detected problem and the network resources available, there could be multiple choices of corrective actions, some of which could be simple, while others could be more involved, for example, by requiring extensive changes to the current network configuration.

With some types of customers and/or services, changes in usage of the network 101 can be rapid in nature. Internet protocol (IP) networks are generally bursty in nature. The level of traffic (e.g. voice, video, data, etc.) utilizing a network link can greatly fluctuate at any given time, and trends in usage can vary over periods of time. Such trends can be tracked and analyzed by traffic engineering system 117. IP networks must be able to adapt to changing trends in traffic on the network in order to efficiently utilize resources of the network 101, and ensure QoS guarantees and satisfy SLA requirements.

By way of example, transport network 101 can utilize the Multiprotocol Label Switching (MPLS) protocol. Data transmission over an MPLS system involves the establishment of label-switched paths (LSPs), which are a sequence of labels stemming from every node within the communication path from a source node to a destination node. Resource Reservation Protocol (RSVP) or label distribution protocol (LDP) can be used to distribute the labels. With respect to an Internet Protocol (IP)-based network MPLS can map IP addresses to fixed-length labels for processing by packet-forwarding or packet-switching platforms. MPLS, which is independent of Layer 2 and Layer 3 protocols, can support a variety of protocols. Accordingly, these networks 103a-103n may further utilize network elements employing a host of technologies, including Gigabit Ethernet, frame relay, Asynchronous Transfer Mode (ATM), Fiber Distributed Data Interface (FDDI), synchronous optical network (SONET), etc.

It is recognized that interior gateway protocols, such as Open Shortest Path First (OSPF) and Intermediate System to Intermediate System (IS-IS), have been extended to support the distribution of Traffic Engineering information so that appropriate Traffic-Engineered Label Switched Paths (LSPs) can be calculated and signaled across an MPLS network. These extensions are specified in Internet Engineering Task Force (IETF) Request for Comment (RFC) 3630 and RFC 3784, for OSPF and IS-IS, respectively, which are incorporated herein by reference in their entireties. It is contemplated that other protocols (e.g., Border Gateway Protocol (BGP), etc.) can be used in conjunction with the above in any combination to provide emergency inter-carrier traffic peering, as some customers may have connections to multiple service provider networks.

In system 100, according to certain embodiments, transport network 101 can provide connectivity to any number of other networks (not shown), which can include a data network, telephony network, and/or wireless network to handle various communication sessions. For example, telephony network may include a circuit-switched network, such as the public switched telephone network (PSTN), an integrated services digital network (ISDN), a private branch exchange (PBX), or other like network. Wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), long term evolution (LTE), satellite, and the like. Meanwhile, data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

The arrangement of system 100 permits the service provider to provide additional service offerings (such as mesh-to-premises), while effectively creating micro-facilities capable of handling the customer traffic. Such arrangement can be offered as a premium service in a range of services, depending on cost and requirements of the customers. This can also provide the NOC 113 with another means to reach otherwise unreachable backbone facilities during an outage. Furthermore, the approach enables the service provider to re-establish communications for emergency services and organizations based on traffic type, source/destination, etc.

Figure 2A:
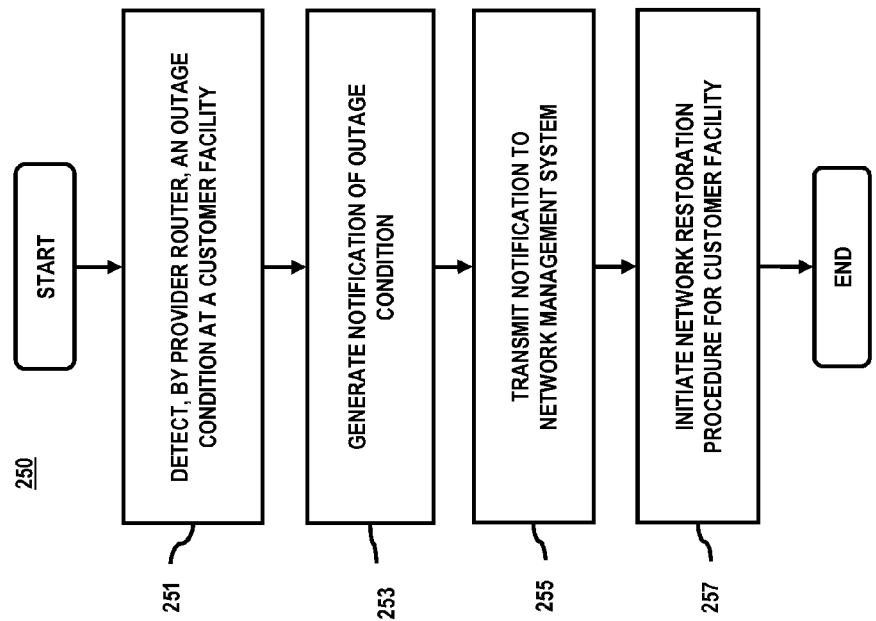
FIGS. 2A and 2B are flowcharts, respectively, of a process for detecting at a provider router an outage condition, and a process for recovery from the outage condition, according to various embodiments.
Figure 2B:
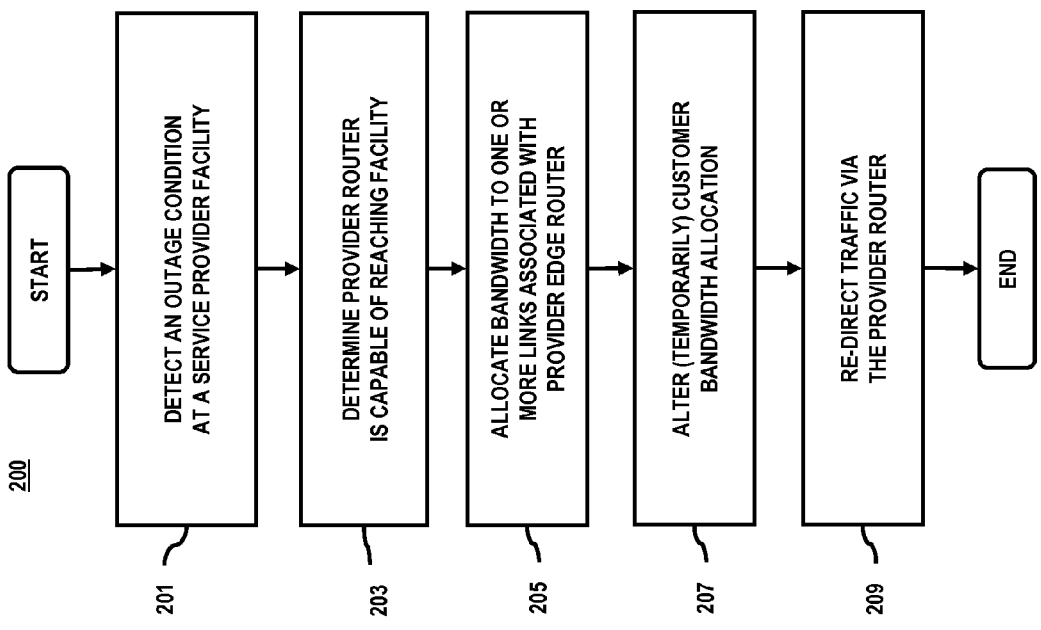

FIGS. 2A and 2B are flowcharts, respectively, of a process for detecting at a provider router an outage condition, and a process for recovery from the outage condition, according to various embodiments. For illustrative purposes, the processes are described with reference to FIG. 1. The steps of these processes may be performed in any suitable order or combined in any suitable manner. As seen in FIG. 2A, process 200 involves, as in step 201, detecting an outage condition at a service provider facility, e.g., Facility A. According to one embodiment, the network management system 115 can process the associated alarms or signals that permit proper detection of the outage condition. In step 203, process 200 determines that the provider router (MFR) 107 is reachable to the failed facility, Facility A. Next, bandwidth is allocated to one or more links (circuits) associated with the provider router 107, per step 205. This allocation can be performed dynamically by the traffic engineering system 117. These one or more links, in one embodiment, are provisioned by the customer to connect to the transport network 101. Next, in step 207, the process 200 may require altering (temporarily—e.g., for the duration of the outage) bandwidth allocation for the customer with respect to the one or more links. That is, the service provider may temporarily requisition bandwidth away from the customer's allocation for the network recovery. After the bandwidth allocations have been made, in step 209, the traffic can then be re-directed and transmitted through the provider router 107. If the service provider is also managing dedicated circuits (not shown) between a customer's facilities, MFRs may route the micro-facility traffic across these if necessary when trying to recover from a large outage. The bandwidth allocation, in one example, is illustrated in FIG. 3.

In addition to the above capability, the placement of the provider router 107 at the customer premise, e.g., customer facility 103a, permits greater network transparency. As shown in FIG. 2B, process 250 provides for detecting by the service provider any outages or failures at the customer facility 103a. In step 251, provider router 107 detects an outage condition associated with the customer facility 103a; e.g., the customer edge router 109 is malfunctioning or a circuit is down. In step 253, a notification of the outage condition is generated, and transmitted to the network management system 115 (step 255). Consequently, a network restoration procedure can be initiated for the customer facility 103a, per step 257.

Figure 3:
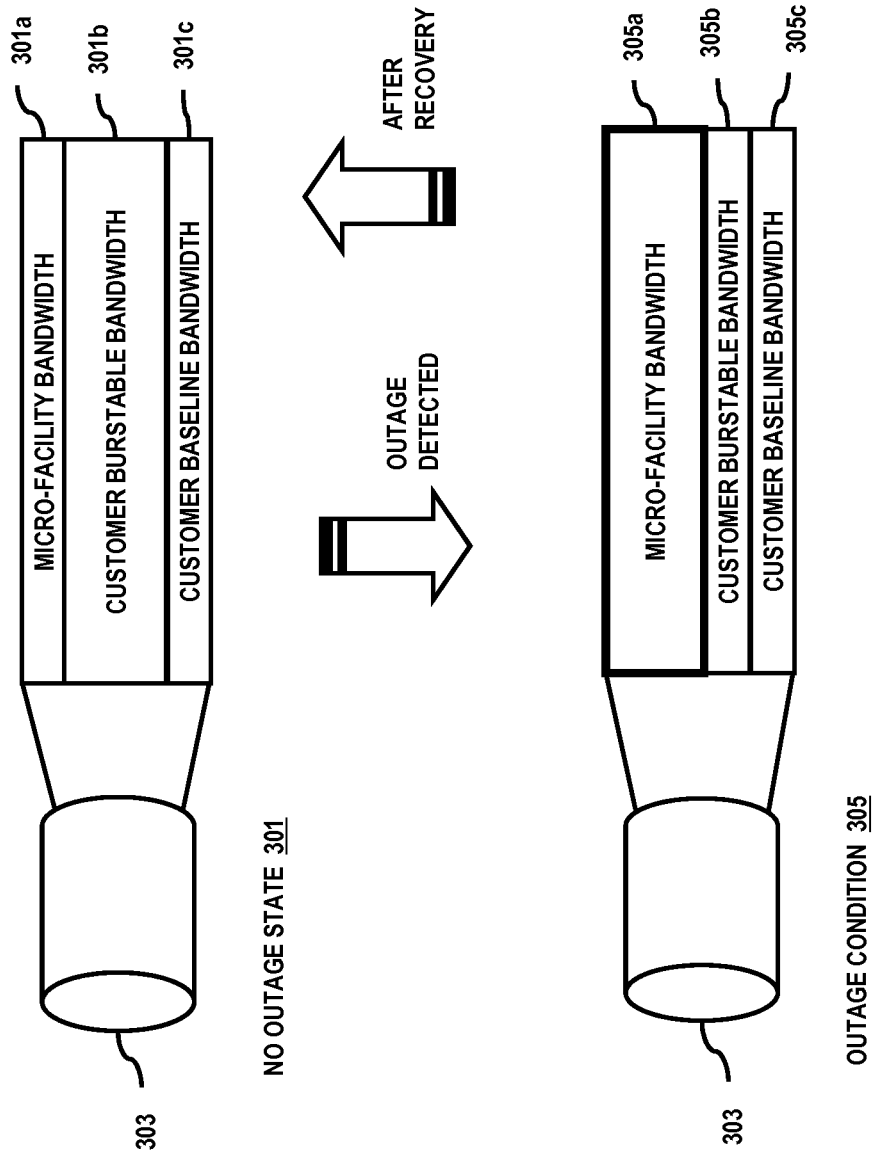
FIG. 3 is a diagram of a bandwidth allocation scheme involving adjustment of customer bandwidth during an outage condition, according to one embodiment.

FIG. 3 is a diagram of a bandwidth allocation scheme involving adjustment of customer bandwidth during an outage condition, according to one embodiment. Because the customer's purchased bandwidth (minimum and burstable) are separate from the total bandwidth available to the MFR 107, these bandwidth requirements can be grown as-needed up to the full capacity available to the MFR 107 with a minimal amount held in reserve for outage-recover MFR traffic. In the event of an outage, the customer's burstable volume may decrease to create additional bandwidth for emergency service recovery; however, if the MFR 107 has sufficient bandwidth to other backbone facilities, such reduction may not be necessary.

In this example, under normal operating conditions, or no outage state 301, circuit 303 provides for the following bandwidth allocations: micro-facility bandwidth 301a, customer burstable bandwidth 301b, and customer baseline bandwidth 301c. In the no outage situation, micro-facility bandwidth 301a and customer baseline bandwidth 301c allocations are approximately equal, while customer burstable bandwidth 301b is assigned more capacity. However, upon occurrence of an outage condition, the link or circuit 303 assumes a different allocation, whereby micro-facility bandwidth 305a is increased to carry the re-directed traffic, while customer burstable bandwidth 305b is decreased, and customer baseline bandwidth 305c remains the same. The micro-facility bandwidth 301a may be encrypted to ensure data privacy and integrity, according to one embodiment. Additionally, in certain embodiments, this traffic may also be separated by time division multiplexing, bandwidth allocations and channel separation may be managed as time slices, logical channels, or even tunnels across a common carrier channel.

With provider router 107 residing within the customer facility 103a, the bandwidth allocations can be effected in real or near-real time with minimal disruption to the customer's requirements. Moreover, it is contemplated that if sufficient bandwidth exists in the no outage state 301, the NOC 113 need not make any bandwidth adjustments; and thus, the customer would not experience any difference is service level.

Figure 4:
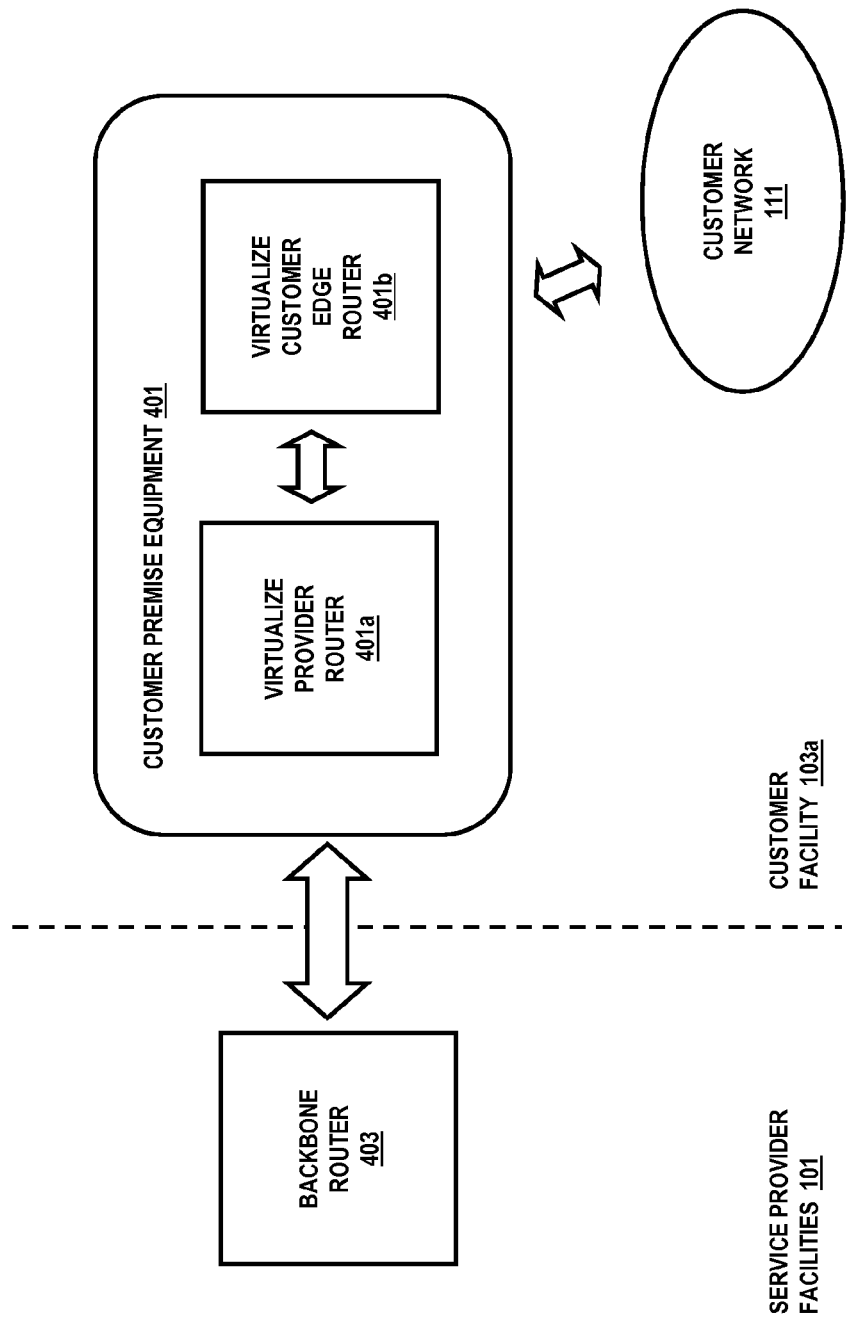
FIG. 4 is a diagram of a customer premise equipment (CPE) providing a virtualized provider router, according to one embodiment.

FIG. 4 is a diagram of a customer premise equipment (CPE) providing a virtualized provider router, according to one embodiment. Under this scenario, a customer premise equipment (CPE) 401 can provide the functionalities of the provider router 107 and the customer edge router 109 within a single physical device. As illustrated, a virtualized provider router 401a and a virtualized customer edge router 401b reside within a common housing to serve customer network 111. Additionally, CPE 401, according to certain embodiments, can interface directly with a backbone router 403 of the service provider network (or facilities) 101.

In one embodiment, a tunnel can be established across the CPE 401 (which can be managed or optionally unmanaged) with a leaseback arrangement to credit the customer for actual bandwidth used, as the bandwidth was provisioned by the customer.

These virtualized (or logical) routers 401a and 401b can work independently with any of the above internetworking protocols. In one embodiment, the logical routers 401a and 401b in a sense are similar to physical routers in that they possess their own set of hardware and software resources (e.g., processors, line cards, configuration, interfaces, and protocols).

Figure 5A:
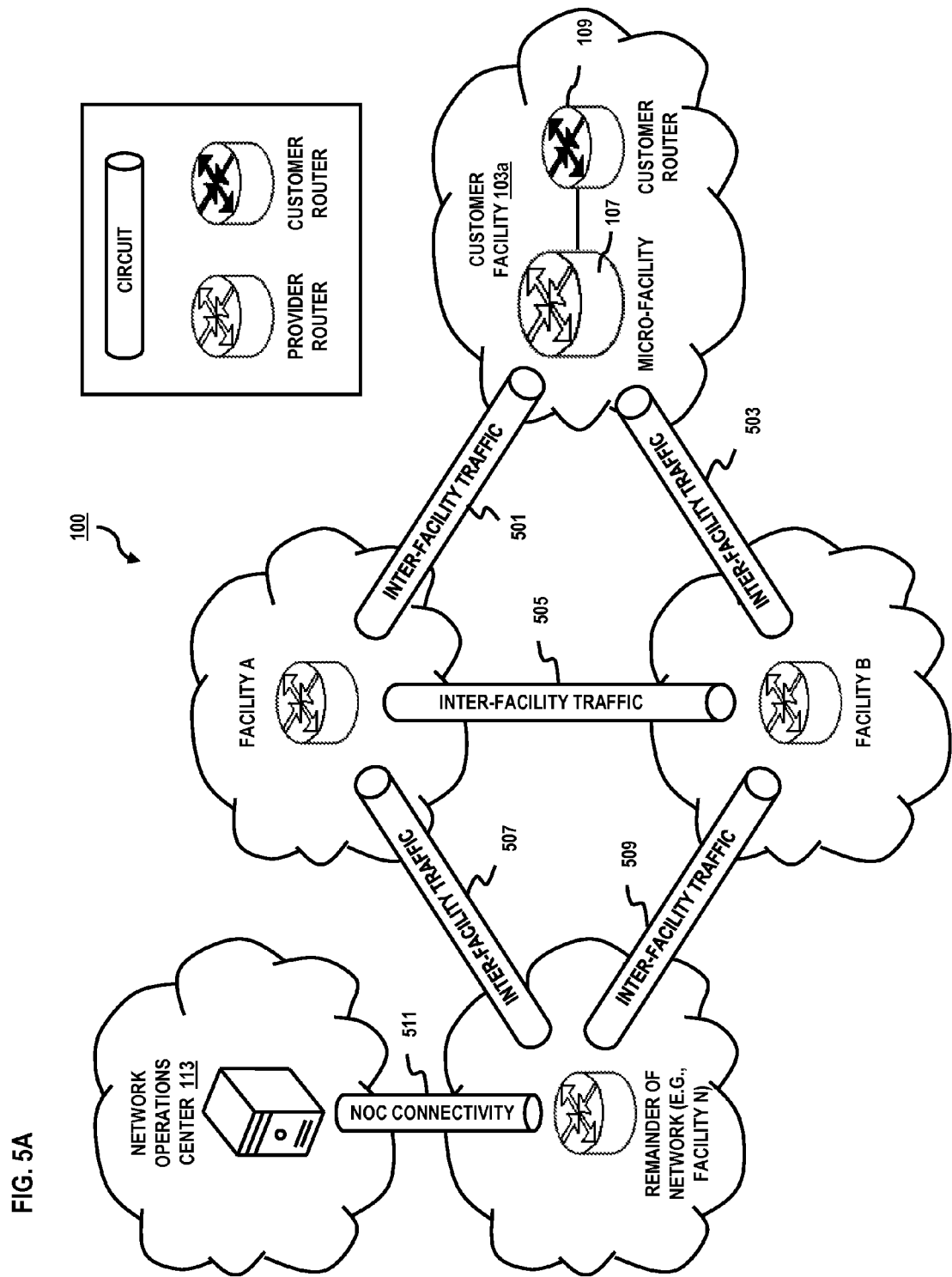
FIGS. 5A and 5B are diagrams of an example of a service provider transport network capable of recovering from an outage at a facility reachable by a micro-facility, according to various embodiments.
Figure 5B:
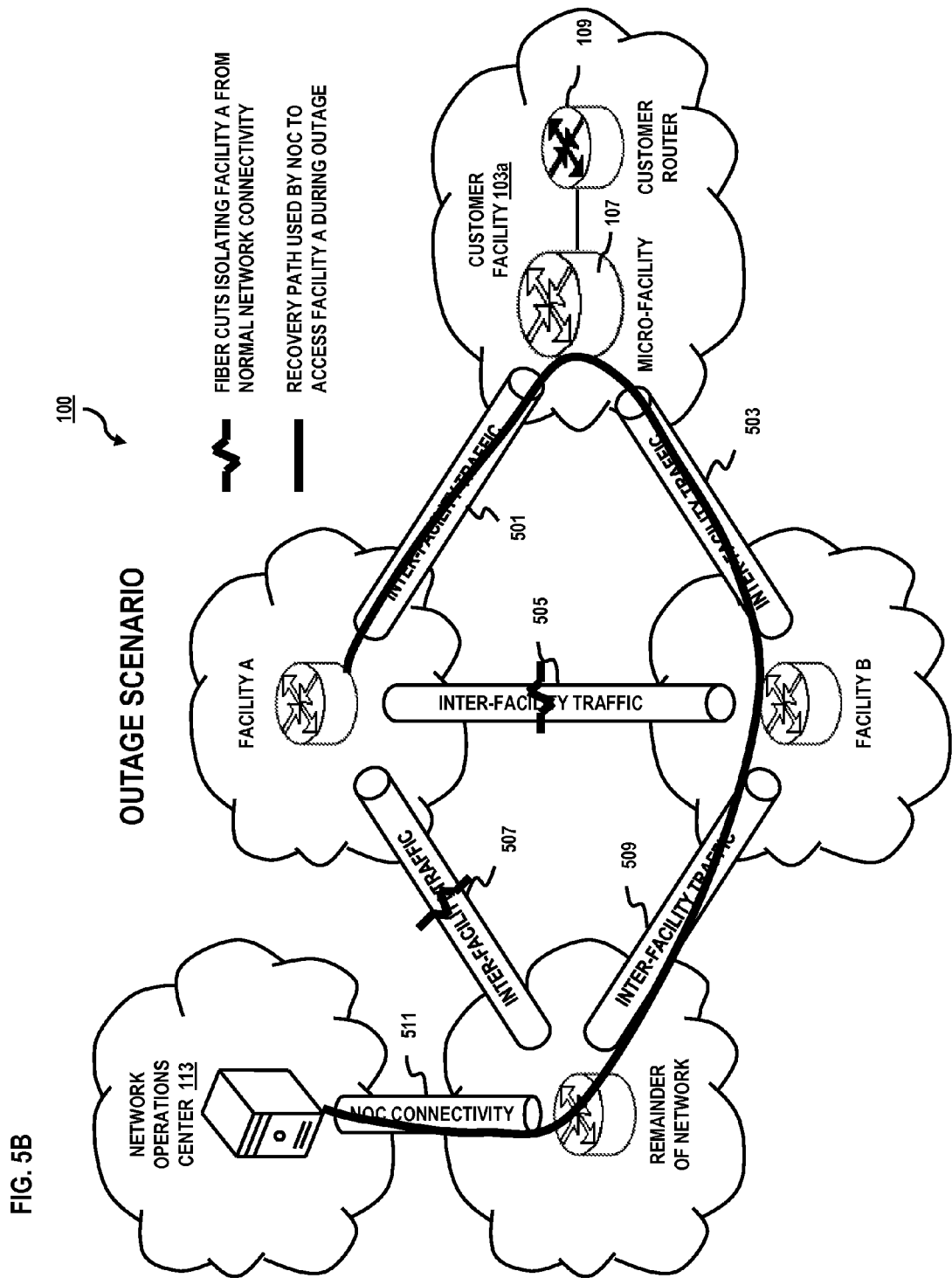

FIGS. 5A and 5B are diagrams of an example of a service provider transport network capable of recovering from an outage at a facility reachable by a micro-facility, according to various embodiments. In this scenario of FIG. 5A (which is a different depiction of system 100), MFR 107 has connectivity to Facility A via inter-facility traffic link 501 and Facility B via inter-facility traffic link 503. Also, in this exemplary topology, Facility A, Facility B, and Facility N are fully meshed with links 505, 507, and 509. A separate link 511 connects NOC 113 to the remainder of the service provider network 101 at Facility N, for example.

In FIG. 5B, an outage scenario is shown, whereby links 505 and 507 are compromised (e.g., fiber cut) or otherwise unavailable, resulting in isolation of Facility A from the rest of the backbone network 101. The NOC 113 confirms that the micro-hub, or MFR, 107 at customer facility 103a is able to reach Facility A across a different fiber path. Upon such confirmation, the NOC 113 increases the bandwidth allocation across the micro-hub links 501 and 503 (possibly reducing customer burstable bandwidth, as explained in FIG. 3). At this point, the NOC 113 reroutes critical traffic (based on, e.g., type and/or source/destination) across the micro-facility 107. These actions may also be performed automatically based on preconfigured conditions and instructions or through implementation and use of a protocol to support this form of network recovery.

With this approach, the NOC 113 can also utilize micro-facility connectivity to identify specific customer outages not otherwise confirmable from the rest of the network 101; thus allowing these circuits to be identified for repair work as well rather than delaying discovery of the additional down circuits until the primary outage is resolved. As another benefit, with the other circuits supporting a MFR being in a known-good state, a particular circuit requiring testing or work could be brought down at any time without impacting the customer's service, e.g., Internet access, or SLA. Moreover, the service provider may use a managed customer edge device (as shown in FIG. 4) instead of deploying separate MFRs to provide both service level enhancements and outage recovery, thus making the customer edge device a de facto MFR. It is noted that use of customer equipment is with prior customer consent and micro-facility traffic may be capped at pre-determined levels to ensure contractual compliance.

Figure 6:
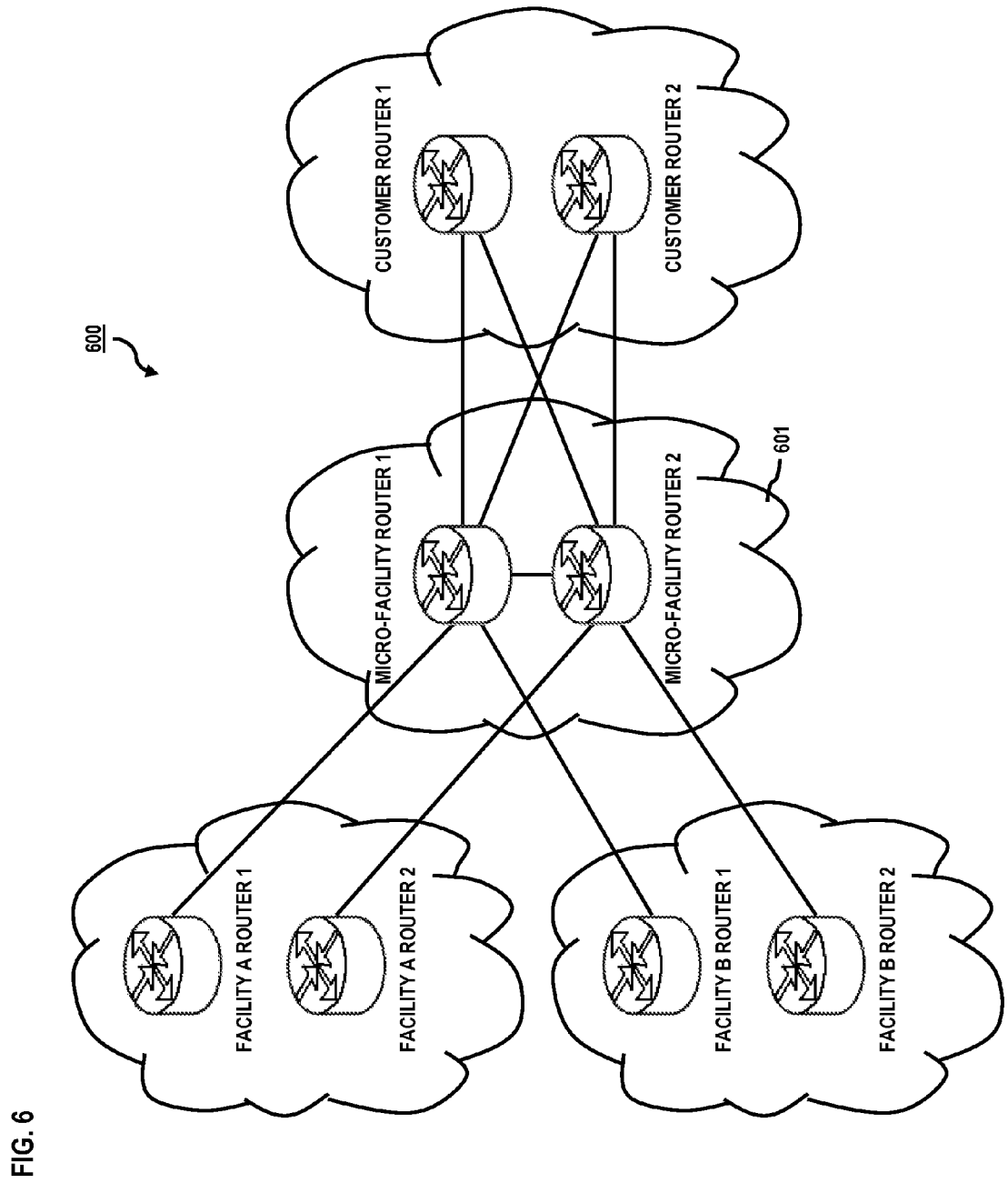
FIG. 6 is a diagram of a micro-facility arrangement interfacing with a customer facility, according to one embodiment.

FIG. 6 is a diagram of a micro-facility arrangement interfacing with a customer facility, according to one embodiment (mesh-to-customer). The topology 600 provides two routers at each facility, whether the service provider's or the customers. Also, the micro-facility 601 would utilize two routers, Router 1 and Router 2. These devices of micro-facility 601 are meshed with at least two routers at two different sites (Facility A and Facility B). This arrangement provides high-availability, which can be offered to top tier customers with a minimum risk of being penalized by SLAs and ensuring higher performance with respect to customer availability. This is especially important when considering the potential impact of router repairs/upgrades, circuit grooming, common outages, and the need for circuit growth to meet a customer's needs. All these factors and parameters can create outages from the customer's perspective.

As shown, this approach of delivery also allows for direct connection of MFRs 601 to backbone routers (Facility A Router 1, Facility A Router 2. etc.), as to expedite delivery of customer traffic to other areas (e.g., metropolitans) and peering points. Such capability, in addition, permits the service provider to drop a given customer's peering traffic at a location other than the closest one, or at an alternate peering facility (as requested by the customer). In an example use case, use of micro-facilities can provide support Massively Multiple Online Game (MMOG) providers, whereby such customers can pull their hosting back to a smaller number of physical hosting locations, thus reducing overall costs while maintaining high-availability and low latency to major markets around the country and the globe. By offloading processing of high-volume, small-packet traffic to micro-facilities, the service provider also improves performance on traditional edge devices in normal backbone facilities.

Moreover, if a customer has several major data facilities, the service provider can utilize additional links between certain micro-facilities to provide faster transit as well as the assurance that the customer's traffic remains on-network (i.e., not requiring another provider's network resources), while effectively offloading traffic from the normal backbone sites.

In effect, the above approach creates a new class of routers in provider facilities. That is, instead of connecting the customer directly to a core transit router or carrying micro-facility traffic across customer gateways, a hybrid class router may be implemented to allow for easier management in such scenarios.

Although the example of FIG. 6 is a fully meshed implementation, it is contemplated that other topologies can be utilized, depending on the requirements in terms of redundancy and reliability. For example, a single circuit can be used to connect to one or both provider facilities (Facility A and Facility B), whereby more circuits can be used for load balancing. Further, additional circuits to other provider facilities (Facility N) can be deployed to expedite traffic to peering points or major metro areas, etc.

The above processes and arrangements advantageously, according to certain embodiments, increased network availability and circuit utilization (minimizing waste of network resources). Also, the network recovery capability is expanded beyond the service provider facilities, such that the service provider can have costs of operations be shared with the customer. This permits more rapid restoration of network outages. Further, the approach is scalable, as the number of customers increase.

The processes described herein for providing micro-facilities for network recovery may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local area network (LAN) 721; additionally or alternatively, network 721 can be a metropolitan area network (MAN), or a wide area network (WAN). For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN; alternatively the interface 717 can be configured as a MAN card or a WAN card. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 5, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set or chip 800 upon which an embodiment of the invention may be implemented. Chip set 800 is programmed to configure a mobile device to enable accident detection and notification functionality for use within a vehicle as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of FIGS. 2A and 2B.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to configure a mobile device to enable accident detection and notification functionality for use within a vehicle. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting a first outage condition of a first inter-facility traffic link in-between a network operation center and a first service provider facility and a second outage condition of a second inter-facility traffic link in-between the network operation center and a service provider facility of a plurality of service provider facilities forming a service provider network;
    determining, during the first and second outage conditions, a provider router of the service provider network that is capable of reaching the first service provider facility and the second service provider facility, wherein the provider router is resident within a customer facility and directly connected to a backbone router of the service provider network, and wherein the first service provider facility, the second service provider facility, and the customer facility are at three different locations;
    allocating, during the first and second outage conditions, bandwidth to other inter-facility traffic links connecting the first service provider facility and the provider router for re-directing traffic from the network operation center via the second service provider facility and then the provider router to the first service provider facility;
    determining, during the first and second outage conditions, that a customer burstable bandwidth allocated to the customer facility via the other inter-facility traffic links for a no-outage state is insufficient to accommodate the bandwidth allocated to the first and second links; and
    altering, during the first and second outage conditions, bandwidth allocation within the other inter-facility traffic links for transporting traffic of the customer facility by decreasing the customer burstable bandwidth allocated to the customer facility while increasing a micro-facility bandwidth allocated to the customer facility thereby accommodating the traffic from the network operation center via the second service provider facility and the provider router to the first service provider facility, wherein a customer baseline bandwidth allocated to the customer facility within the other inter-facility traffic links remains unchanged during the altering,
    wherein each of the first service provider facility and the second service provider facility houses a plurality of backbone routers, and the second service provider facility is a peering service provider facility other than a service provider facility closest to the first service provider facility.

2. A method according to claim 1, wherein the first and second inter-facility traffic links do not pass via the provider router, and
    the provider router is a provider edge router configured to connect to a customer router at the customer facility and to detect the first and second outage conditions, and the customer router is configured to forward traffic over the service provider network.

3. A method according to claim 2, wherein the provider router and the customer router are virtualized within a common physical router, and
    the first outage condition is associated with an edge router of the first service provider facility.

4. A method according to claim 2, wherein the provider router couples to another provider router within the customer facility, and the provider routers are connected to an edge router of the first service provider facility, an edge router of the second service provider facility, and the customer router in a full-mesh.

5. A method according to claim 1, further comprising:
    monitoring the provider router to determine an outage condition for the customer facility.

6. An apparatus comprising:
    at least one processor; and
    at least one memory including computer program code for one or more programs,
    the at least one memory and the computer program code configured to, with the at least one processor, cause the apparatus to perform at least the following:
        detect a first outage condition of a first inter-facility traffic link in-between a network operation center and a first service provider facility and a second outage condition of a second inter-facility traffic link in-between the network operation center and a service provider facility of a plurality of service provider facilities forming a service provider network;

determine, during the first and second outage conditions, a provider router of the service provider network that is capable of reaching the first service provider facility and the second service provider facility, wherein the provider router is resident within a customer facility and directly connected to a backbone router of the service provider network, and wherein the first service provider facility, the second service provider facility, and the customer facility are at three different locations;

allocate, during the first and second outage conditions, bandwidth to other inter-facility traffic links connecting the first service provider facility and the provider router for re-directing traffic from the network operation center via the second service provider facility and then the provider router to the first service provider facility;

determine, during the first and second outage conditions, that a customer burstable bandwidth allocated to the customer facility via the other inter-facility traffic links for a no-outage state is insufficient to accommodate the bandwidth allocated to the first and second links; and alter, during the first and second outage conditions, bandwidth allocation within the other inter-facility traffic links for transporting traffic of the customer facility by decreasing the customer burstable bandwidth allocated to the customer facility while increasing a micro-facility bandwidth allocated to the customer facility thereby accommodating the traffic from the network operation center via the second service provider facility and the provider router to the first service provider facility, wherein a customer baseline bandwidth allocated to the customer facility within the other inter-facility traffic links remains unchanged during the altering, wherein each of the first service provider facility and the second service provider facility houses a plurality of backbone routers, and the second service provider facility is a peering service provider facility other than a service provider facility closest to the first service provider facility.

7. An apparatus according to claim 6, wherein the provider router is a provider edge router configured to connect to a customer router at the customer facility, and the customer router is configured to forward traffic over the service provider network.

8. An apparatus according to claim 7, wherein the provider router and the customer router are virtualized within a common physical router.

9. An apparatus according to claim 7, wherein the provider router couples to another provider router within the customer facility, and the provider routers are connected to the customer router in a full-mesh.

10. An apparatus according to claim 6, wherein the apparatus is further caused to determine an outage condition for the customer facility.

11. A system comprising:
a plurality of backbone routers configured to route traffic received from one or more customer routers, the backbone routers being a part of a service provider network, wherein a first backbone router is hosted in a first service provider facility and a second backbone router is hosted in a second service provider facility;

a plurality of provider routers configured to communicate with the first and second backbone routers of the backbone routers, wherein the provider routers are resident within a customer facility housing one of the customer routers and are directly connected to a backbone routers of the service provider network, at least one of the provider routers is capable of reaching the first backbone router and the second backbone router, and the first service provider facility, the second service provider facility, and the customer facility are at three different locations; and a network operation center configured to redirect traffic over to inter-facility traffic links connecting the first backbone router and the second backbone router to the at least one provider router, in response to a first outage condition of a first inter-facility traffic link in-between the network operation center and the first backbone router and a second outage condition of a second inter-facility traffic link in-between the network operation center and the second backbone router; to determine, during the first and second outage conditions, that a customer burstable bandwidth allocated to the customer facility via the other inter-facility traffic links for a no-outage state is insufficient to accommodate the bandwidth allocated to the first and second links; and to alter, during the first and second outage conditions, bandwidth allocation within the other inter-facility traffic links for transporting traffic of the customer facility by decreasing the customer burstable bandwidth allocated to the customer facility while increasing a micro-facility bandwidth allocated to the customer facility thereby accommodating the traffic from the network operation center via the second service provider facility and the provider router to the first service provider facility, wherein a customer baseline bandwidth allocated to the customer facility within the other inter-facility traffic links remains unchanged during the altering, wherein the one or more links are temporarily allocated bandwidth during the first and second outage conditions for the re-direction of the traffic from the network operation center via the second backbone router and then the at least one provider router to the first backbone router, and the at least one provider router is determined during the first and second outage conditions, and the second service provider facility is a peering service provider facility other than a service provider facility closest to the first service provider facility.

12. A system according to claim 11, wherein the at least one provider router is configured to connect to a customer router at the customer facility, the customer router being configured to forward traffic over the service provider network.

13. A system according to claim 12, wherein the at least one provider router and the customer router are virtualized within a common physical router.

14. A system according to claim 12, further comprising:
another provider router coupled to the at least one provider router within the customer facility in a full-mesh.

15. A system according to claim 11, wherein the network operation center is further configured to monitor the at least one provider router to determine an outage condition for the customer facility.

* * * * *